United States Patent [19]

Reiterman et al.

[11] Patent Number: 4,461,044
[45] Date of Patent: Jul. 24, 1984

[54] BICYCLE HELMET RETENTION SYSTEM WITH QUICK DISCONNECT

[75] Inventors: Donald R. Reiterman, Glendora; James G. Sundahl, Irvine, both of Calif.

[73] Assignee: Bell Helmets Inc., Norwalk, Calif.

[21] Appl. No.: 385,020

[22] Filed: Jun. 4, 1982

[51] Int. Cl.³ .............................................. A42C 5/04
[52] U.S. Cl. ......................................... 2/421; 24/237; 24/308
[58] Field of Search ................... 24/19, 68 SB, 68 PP, 24/237, 308, 68 E; 2/421

[56] References Cited

U.S. PATENT DOCUMENTS

| | | | |
|---|---|---|---|
| 935,556 | 9/1909 | Smith | 2/171.4 |
| 1,347,046 | 7/1920 | McDonough | 2/410 |
| 1,853,387 | 4/1932 | Vetter | 24/237 |
| 1,934,951 | 11/1933 | Schaefer | 24/308 |
| 2,769,176 | 11/1956 | Grancsay | 2/421 |
| 2,846,683 | 8/1958 | Dye | 2/421 |
| 2,991,478 | 7/1961 | Zbikowski | 2/421 |
| 3,082,428 | 3/1963 | Zbikowski | 2/418 |
| 3,310,811 | 3/1967 | Iacono, Jr. | 2/6 |
| 3,344,433 | 10/1967 | Stapenhill | 2/420 |
| 3,496,854 | 2/1970 | Feldman | 2/410 X |
| 3,783,450 | 1/1974 | O'Connor | 2/425 X |
| 3,873,997 | 4/1975 | Gooding | 2/421 X |
| 3,925,821 | 12/1975 | Lewicki | 2/425 |
| 3,925,821 | 12/1975 | Lewicki | 2/425 |
| 4,044,400 | 8/1977 | Lewicki | 2/421 |

Primary Examiner—Werner H. Schroeder
Assistant Examiner—Judy L. Kravitz
Attorney, Agent, or Firm—William W. Haefliger

[57] ABSTRACT

A helmet retention system for a forwardly facing helmet includes:
(a) a clip having first, second and third attachment structures which are integrally interconnected,
(b) the first attachment structure including generally forwardly extending parallel slots in which a left or right retention strap section is threadable for strap length adjustment,
(c) the second attachment structure including a generally upwardly extending additional slot to receive one of two rear strap sections, and
(d) the third attachment structure including a hook below the level of said first attachment structure to removably support a connector operatively connected to the other of the left and right retention strap sections, and a cantilevered retainer adapted to be deflected when the connection is applied to the hook or removed therefrom, and which otherwise retains the connector against removal from the hook.

10 Claims, 8 Drawing Figures

U.S. Patent   Jul. 24, 1984   Sheet 1 of 2   4,461,044
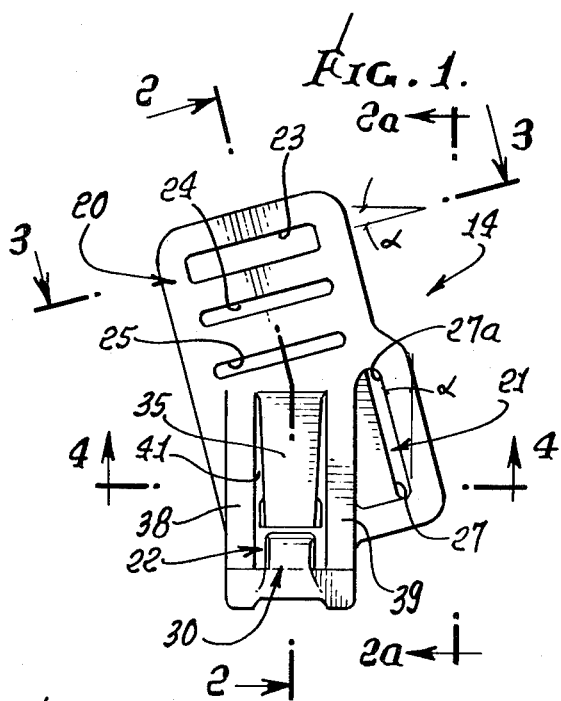
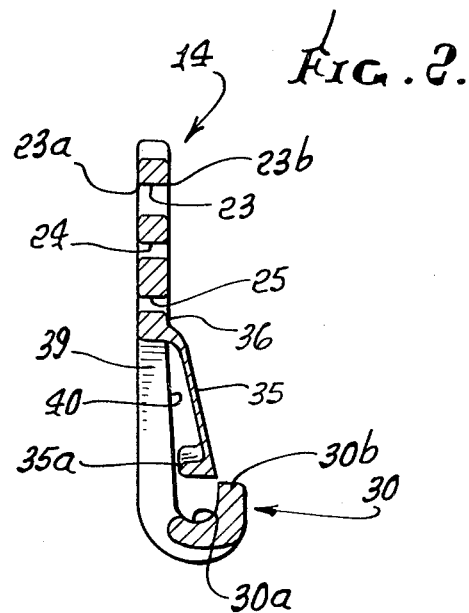
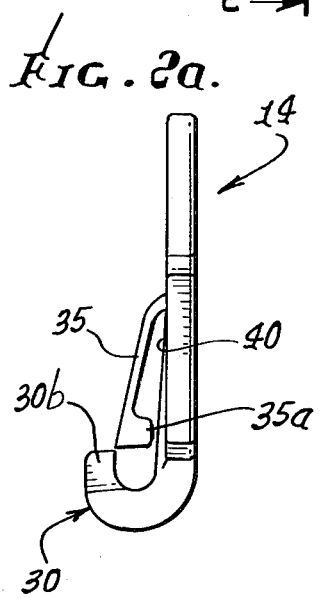
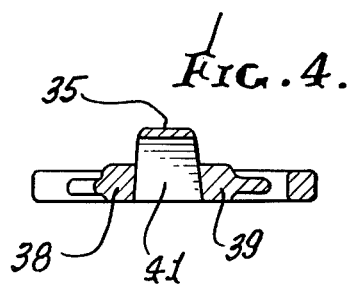
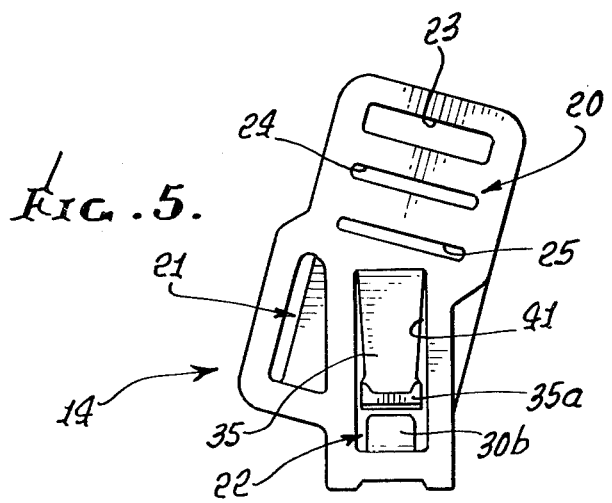

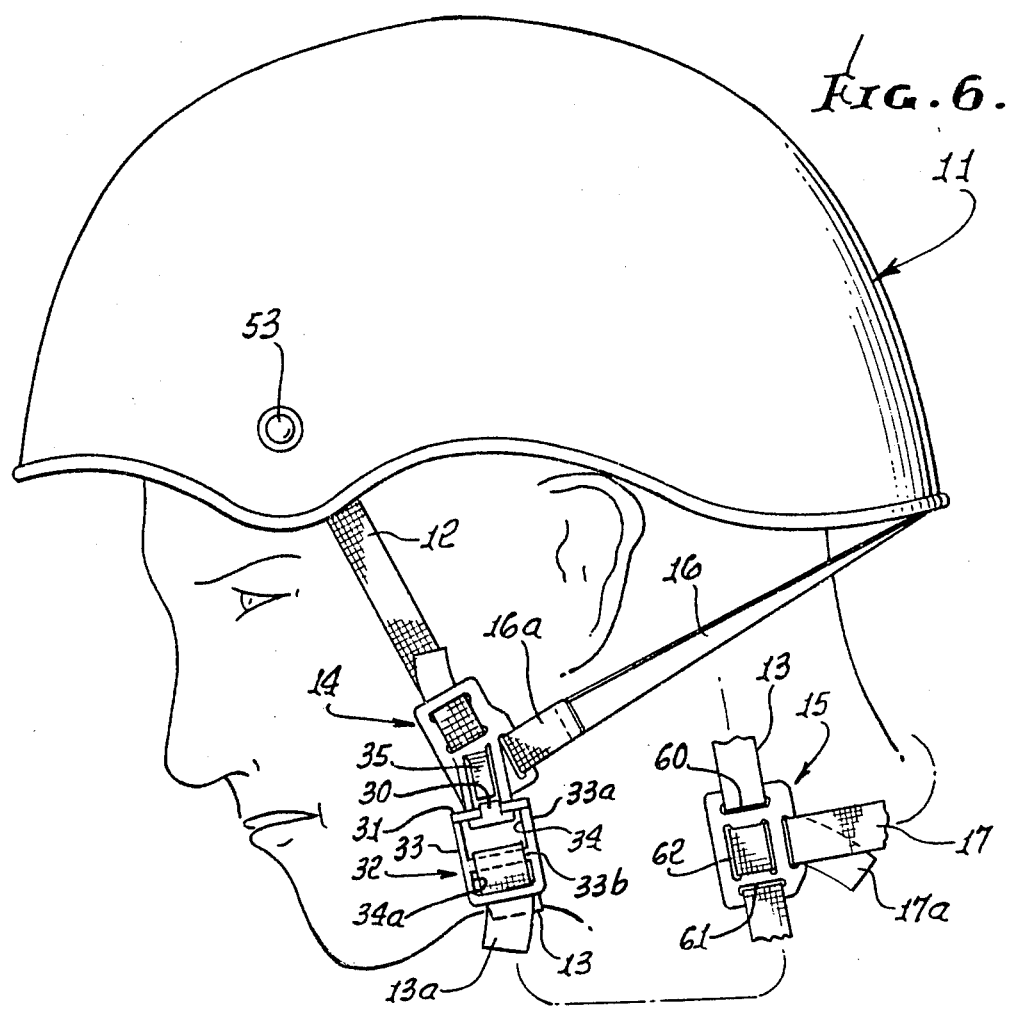
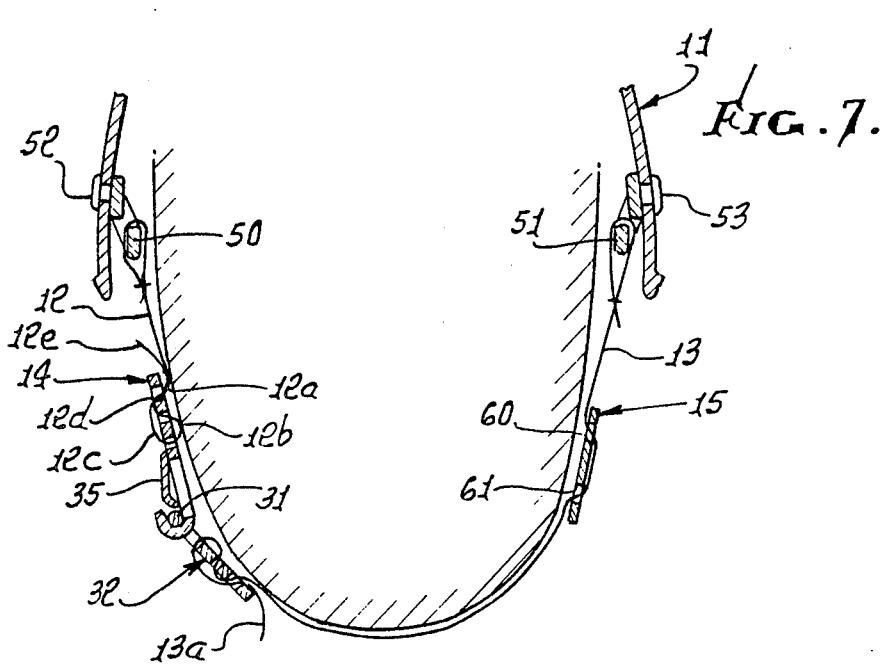

BICYCLE HELMET RETENTION SYSTEM WITH QUICK DISCONNECT

BACKGROUND OF THE INVENTION

This invention relates generally to helmet retention, and more particularly concerns improvements in chin straps and their conformability to wearers, including quick connection and dis-connection and ready adjustability.

There is need for a bicycle or motorcycle helmet retention harness having the following characteristics:

(1) means for quick one-handed connection, as well as disconnection, obviating need for repeated adjustment of harness straps each time the helmet is worn;
(2) conformability of the connections or clips to the angle of the wearer's jaw;
(3) construction of strap connections to allow back-strap location well under the earlobes;
(4) construction of strap connections or clips permitting three-point connection of the straps to the helmet;
(5) adjustability of helmet straps to one or more clips, while preventing unwanted strap slippage.

SUMMARY OF THE INVENTION

It is a major object of the invention to provide an improved harness, and particularly a multi-function main clip, satisfying the above needs.

Basically, the system includes:
(a) left and right retention strap sections attachable to the helmet,
(b) and rear strap sections attachable to the helmet.

In this environment, the invention includes the improvement that comprises:
(c) a clip having first, second and third attachment structures which are integrally interconnected,
(d) the first attachment structure including generally forwardly extending parallel slots in which one of the left and right retention strap sections is threadable for strap length adjustment,
(e) the second attachment structure including a generally upwardly extending additional slot to receive one of the rear strap sections, and
(f) the third attachment structure including a hook below the level of said first attachment structure to removably support a connector operatively connected to the other of the left and right retention strap sections, and a cantilevered retainer adapted to be deflected when the connector is applied to the hook or removed therefrom, and which otherwise retains the connector against removal from the hook.

As will be seen, the retainer typically includes an arm projecting downwardly; the parallel slots project forwardly and downwardly at a shallow angle from horizontal; the hook also extends vertically and defines a receptacle for the connector; the retainer arm has a lower terminal lying directly over the receptacle, the arm being resiliently deflectible into a space defined between vertically extending legs of the clip body, to allow quick connection of the connector to the hook, and disconnection therefrom.

These and other objects and advantages of the invention, as well as the details of an illustrative embodiment, will be more fully understood from the following specification and drawings, in which:

DRAWING DESCRIPTION

FIG. 1 is a side elevation showing a clip embodying the invention;
FIG. 2 is a vertical section on lines 2—2 of FIG. 1;
FIG. 2a is a vertical section on lines 2a—2a of FIG. 1;
FIG. 3 is a section on lines 3—3 of FIG. 1;
FIG. 4 is a section on lines 4—4 of FIG. 1;
FIG. 5 is an opposite side elevation of the FIG. 1 clip;
FIG. 6 is a side elevation showing a retention system incorporating the clip of FIGS. 1–5; and
FIG. 7 is a vertical section showing the FIG. 6 retention system, viewed forwardly.

DETAILED DESCRIPTION

FIGS. 6 and 7 show the provision of a retention system or harness 10 for helmet 11. The system comprises left and right retention strap sections 12 and 13 attached to the helmet sides; left and right clips 14 and 15 respectively attached to the strap sections 12 and 13; and rear strap sections 16 and 17 attached to the helmet rear at 18. In FIG. 6, clip 15 is shown shifted out of position, for visibility.

The improved one-piece, molded plastic clip 14 shown in detail in FIGS. 1–5 has first, second and third attachment structures which are integrally interconnected, and designated at 20, 21 and 22 in FIGS. 1 and 5.

The first such structure 20 includes multiple generally forwardly extending slots in which one of the left and right strap sections is threaded for strap length adjustment and clip retention. Three such slots are shown at 23, 24 and 25 extending in parallel relation, forwardly and downwardly, at angle $\alpha$ from horizontal. Angle $\alpha$ is between 5° and 25°, to conform the straps to the helmet and the face and jaw of the wearer, as will appear. FIG. 7 shows strap section 12 passing at 12a from the inside to the outside of upper slot 23; then downwardly and passing at 12b from the outside to the inside of middle slot 24; then passing downwardly and outwardly at 12c from the inside of the outside of lower slot 25; then passing upwardly and inwardly at 12d from the outside to the inside of upper slot 23; and then extending freely upwardly as a tab 12a, for finger gripping and adjustment. Slot 23 has sharp upper edges at 23a and 23b to pinch strap portions 12a and 12d preventing slip. The remaining edges of the slots are smooth or beveled so as not to grip the strap.

The second attachment structure 21 includes a generally upwardly extending additional slot 27 to receive one of the rear strap sections, as for example left section 16, i.e. a loop 16a formed by section 16. Note slot 27 has a rear upright edge 27a inclined at angle $\alpha$ from vertical. Edge 27a supports loop 16a.

The third attachment structure 22 includes an upwardly and laterally outwardly looping hook 30 below the level of structure 20. Hook 30 extends vertically, and is adapted to support a cross-piece 31 of a connector 32. The latter includes other parallel cross-pieces 33 and 33a, with slots 34 and 34a separating the cross pieces as shown. Strap section 13 is threaded through the slots 34 and 34a and about the cross piece 33b, as shown in FIG. 7, the end portion 13a of that strap section hanging freely for adjustment purposes.

The third structure 22 also includes a cantilevered retainer arm 35 that projects vertically downwardly from junction 36 with the clip body, and also laterally outwardly toward the hook receptacle portion 30a inwardly of hook lip 30b. The retainer arm has an enlarged lower terminal 35a that extends across the gap between the hook lip 30b and a plane 40 defined by the two vertical legs 38 and 39 of the clip body. Legs 38 and 39 are spaced apart at 41 to permit resiliently yieldable deflection of the arm 35 toward plane 40, so that terminal 35a may enter space 41, thereby allowing entry of cross-piece 31 into receptacle 30a, or removal of cross-piece 31 from that receptacle; however, when terminal 35a is in the position shown in FIG. 2, it blocks such removal. The act of applying the cross-piece to the hook serves to yieldably deflect the retainer inwardly, to unblock application of the connector to the hook, whereby a very rapid hook-up of the retention system is achieved. This is facilitated by the flat planar shape of the clip 14 which presses against the cheek of the wearer, to support the clip during such hook-up. This quick connect-disconnect feature frees the wearer from having to re-adjust the harness each time the helmet is put on.

Clip 15 defines two parallel slots 60 and 61 to pass the strap section 13, as shown, permitting sliding of clip 15 therealong. Also, clip 15 defines a slot 62 to receive the end loop 17a of rear strap section 17.

FIG. 7 shows the upper ends of the strap sections 12 and 13 as looped about clips 50 and 51 which are attached, as by rivets 52 and 53, to the sides of the helmet.

We claim:

1. For use in a helmet retention system for a forwardly facing helmet, the system including
   (a) left and right retention strap sections attachable to the helmet,
   (b) and rear strap sections attachable to the helmet, the improvement comprising
   (c) a clip having first, second and third attachment structures which are integrally interconnected,
   (d) the first attachment structure including generally forwardly extending parallel slots in which one of said left and right retention strap sections is threadable for strap length adjustment,
   (e) the second attachment structure including a generally upwardly extending additional slot to receive one of said rear strap sections, and
   (f) the third attachment structure including a hook below the level of said first attachment structure to removably support a connector operatively connected to the other of said left and right retention strap sections, and a cantilevered retainer adapted to be deflected when said connection is applied to the hook or removed therefrom, and which otherwise retains the connector against removal from the hook,
   (g) the clip having a vertically planar body having spaced vertically extending legs, the retainer located to be deflected into the space between the legs.

2. The improvement of claim 1 wherein said retainer projects downwardly, and said parallel slots are inclined forwardly and downwardly from horizontal.

3. The improvement of claim 2 wherein said additional slot has a rear edge inclined forwardly from vertical, and which supports said rear strap section.

4. The improvement of claim 1 wherein the clip consists of integrally molded plastic material.

5. The improvement of claim 1 wherein the clip has sharp edges adjacent the uppermost of said parallel slots.

6. The improvement of claim 1 wherein the hook extends vertically and defines a receptacle for the connector, and said retainer has an arm the free end of which defines a terminal located directly over said receptacle.

7. In a helmet retention system for a forwardly facing helmet, the combination including
   (a) left and right retention strap sections attachable to the helmet,
   (b) and rear strap sections attachable to the helmet,
   (c) a clip having first, second and third attachment structures which are integrally interconnected,
   (d) the first attachment structure including generally forwardly extending parallel slots in which one of said left and right retention strap sections is threadable for strap length adjustment,
   (e) the second attachment structure including a generally upwardly extending additional slot to receive one of said rear strap sections, and
   (f) the third attachment structure including a hook below the level of said first attachment structure to removably support a connector operatively connected to the other of said left and right retention strap sections, and a cantilevered retainer adapted to be deflected when said connection is applied to the hook or removed therefrom, and which otherwise retains the connector against removal from the hook,
   (g) and a second clip in which said other of the left and right straps is threaded for lengthwise adjustment of said second clip therealong, the other of said rear straps also attached to said second clip.

8. The system of claim 1 including a helmet to which said (a) and (b) strap sections are connected.

9. The improvement of claim 1 wherein the retainer and hook project at the front side of the clip, the rear side of the clip defining a flat planar surface common to said first, second and third attachment structures, said flat surface adapted to engage the helmet user's face.

10. For use in a helmet retention system for a forwardly facing helmet, the system including
   (a) left and right retention strap sections attachable to the helmet,
   (b) and rear strap sections attachable to the helmet, the improvement comprising
   (c) a clip having first, second and third attachment structures which are integrally interconnected,
   (d) the first attachment structure including generally forwardly extending parallel slots in which one of said left and right retention strap sections is threadable for strap length adjustment,
   (e) the second attachment structure including a generally upwardly extending additional slot to receive one of said rear strap sections, and
   (f) the third attachment structure including a hook below the level of said first attachment structure to removably support a connector operatively connected to the other of said left and right retention strap sections, and a cantilevered retainer adapted to be deflected when said connection is applied to the hook or removed therefrom, and which otherwise retains the connector against removal from the hook,
   (g) the clip having a generally vertically planar body with spaced generally vertically extending legs, said parallel slots extending lengthwise at a shallow angle $\alpha$ from horizontal, above said legs, and said additional slot extending lengthwise at a shallow angle from vertical at a side of one of said legs.

* * * * *